(12) United States Patent
Farahbod et al.

(10) Patent No.: US 9,613,074 B2
(45) Date of Patent: Apr. 4, 2017

(54) DATA GENERATION FOR PERFORMANCE EVALUATION

(71) Applicants: Roozbeh Farahbod, Karlsruhe (DE); Aryan Dadashi, Karlsruhe (DE)

(72) Inventors: Roozbeh Farahbod, Karlsruhe (DE); Aryan Dadashi, Karlsruhe (DE)

(73) Assignee: SAP SE, Walldorf (DE)

( * ) Notice: Subject to any disclaimer, the term of this patent is extended or adjusted under 35 U.S.C. 154(b) by 239 days.

(21) Appl. No.: 14/334,069

(22) Filed: Jul. 17, 2014

(65) Prior Publication Data

US 2015/0178366 A1 Jun. 25, 2015

Related U.S. Application Data

(60) Provisional application No. 61/920,184, filed on Dec. 23, 2013.

(51) Int. Cl.
*G06F 17/30* (2006.01)
*G06F 11/34* (2006.01)

(52) U.S. Cl.
CPC .... *G06F 17/30306* (2013.01); *G06F 11/3414* (2013.01); *G06F 11/3447* (2013.01); *G06F 2201/80* (2013.01)

(58) Field of Classification Search
None
See application file for complete search history.

(56) References Cited

U.S. PATENT DOCUMENTS

| | | | |
|---|---|---|---|
| 7,640,470 B2 | 12/2009 | Lammel et al. | |
| 7,890,476 B2 | 2/2011 | Haham et al. | |
| 7,917,524 B2 | 3/2011 | Brunswig et al. | |
| 8,037,109 B2 | 10/2011 | Levine et al. | |
| 8,239,423 B2 | 8/2012 | Gitai et al. | |
| 8,677,320 B2 | 3/2014 | Wilson et al. | |
| 2003/0217069 A1 | 11/2003 | Fagin et al. | |
| 2004/0236758 A1* | 11/2004 | Medicke | G06F 17/30539 |
| 2008/0256111 A1* | 10/2008 | Haham | G06F 11/3664 |
| 2012/0143813 A1 | 6/2012 | B'Far et al. | |
| 2012/0330880 A1 | 12/2012 | Arasu et al. | |

(Continued)

OTHER PUBLICATIONS

K. Houkjær, K. Torp, and R. Wind, "Simple and realistic data generation," Proceeding VLDB '06 Proceedings of the 32nd international conference on Very large data bases, pp. 1243-1246, 2006. [Online]. Available: http://dl.acm.org/citation.cfm?id=1164254.

J. E. Hoag and C. W. Thompson, "A parallel general-purpose synthetic data generator," ACM SIGMOD Record archive, vol. 36, pp. 19-24, Mar. 2007. [Online]. Available: http://dl.acm.org/citation.cfm?id=1276305.

(Continued)

*Primary Examiner* — Jay Morrison
(74) *Attorney, Agent, or Firm* — Fish & Richardson P.C.

(57) ABSTRACT

The present disclosure describes methods, systems, and computer program products for generating data for performance evaluation. One computer-implemented method includes identifying a source dataset from a source database, extracting a schema defining the source database, analyzing data within the source dataset to generate a value model, the value model describing features of data in each column of each table of the source dataset, analyzing data within the source database to determine data dependency, and generating a data specification file combining the extracted schema, the value model, and the data dependencies.

20 Claims, 10 Drawing Sheets

(56) References Cited

U.S. PATENT DOCUMENTS

| | | | |
|---|---|---|---|
| 2013/0013584 A1* | 1/2013 | O'Byrne | G06F 17/30536 707/714 |
| 2013/0139003 A1 | 5/2013 | Patwardhan et al. | |
| 2013/0159353 A1* | 6/2013 | Fuh | G06F 11/3672 707/803 |
| 2014/0006866 A1 | 1/2014 | Clifford et al. | |
| 2014/0007056 A1 | 1/2014 | Leizerovich et al. | |
| 2014/0067868 A1 | 3/2014 | Kemmler et al. | |
| 2014/0172788 A1 | 6/2014 | Haase et al. | |
| 2014/0280287 A1* | 9/2014 | Ganti | G06F 17/30554 707/766 |
| 2014/0282848 A1 | 9/2014 | Patwardhan et al. | |

OTHER PUBLICATIONS

T. Rabl and M. Poess, \Parallel Data Generation for Performance Analysis of Large, Complex RDBMS, DBTest '11 Proceedings of the Fourth International Workshop on Testing Database Systems, 2011. [Online]. Available: http://dl.acm.org/citation.cfm?id=1988847.

P. G. Brown and P. J. Hass, \BHUNT: automatic discovery of fuzzy algebraic constraints in relational data, pp. 668{679, 2003. [Online]. Available: http://dl.acm.org/citation.cfm?id=131545.1315509.

I. F. Ilyas, V. Markl, P. Haas, P. Brown, and A. Aboulnaga, \CORDS: Automatic discovery of correlations and soft functional dependencies, SIGMOD '04 Proceedings of the 2004 ACM SIGMOD international conference on Management of data, pp. 647{658, 2004. [Online]. Available: http://dl.acm.org/citation.cfm?id=1007641.

* cited by examiner

600

```
1   for each Table T do
2     begin
3       T.constraints := getTableConstraint(T);
4       for each column T.x do
5         begin
6           T.x.constraints := getColumnConstraints(T.x);
7           ValueModel vm = null;
8           x_distinct_count := getDistinctCount(T.x);
9
10          if (x_distinct_count = 1) then
11            vm := createConstantValueModel(T.x);
12          else
13            if ((x.dataType is numeric) and (x.isPrimaryKey)) then
14              vm := createSequenceValueModel(T.x)
15            else
16              if (isForeignKeyFlag()) then
17                foreinkeys := getForeignKeys(T.x);
18                if (foreinkeys <> null) then
19                  vm := createForeignKeyValueModel(T.x, foreinkeys);
20                else
21                  if ((x_distinct_count/T.row_count) <=
22                      (samplingThreshold)) then
23                    vm := createProbDistSampleValueModel(T.x);
24
25          if (vm = null) then
26            vm := createUniformValueModel(T.x);
27          if (findInterColumnDependencyFlag()) then
28            vm.add(getDependencies(T, T.x));
29          T.x.ValueModel = vm;
30        end;
31    end;
```

```
1  getDependencies(table T, column T.c_k)
2  begin
3  for each column T.c_j do
4    begin
5      if (j <> k) and
6         (areColumnsAlreadyFound(T.c_k, T.c_j)) then
7         begin
8           if (getDistinctCount(T.c_j) not in [1, T.getTableSize()]) then
9             begin
10              if (getDistinctCount(concat(T.c_k, T.c_j)) =
11                 T.getTableSize()) then
12                begin
13                  return getIntraTableDependency();
14                end;
15              else
16                begin
17                  return getInterColumnDependency();
18                end;
19            end;
20       end;
21   end;
22
23   return null;
24 end;
```

FIG. 8

DATA GENERATION FOR PERFORMANCE EVALUATION

BACKGROUND

Typically, before deployment of an application, test data is required to test and evaluate the performance of the application in a test environment; and then the application is deployed in a target environment. Since real data is typically not available during the testing and development stages, generation of "close-to-real" synthetic data is desirable. Existing approaches of data generation mostly focus on generating data for testing the correctness of the application, but not very useful for performance evaluation of the application.

SUMMARY

The present disclosure relates to computer-implemented methods, computer-readable media, and computer systems for generating data for performance evaluation, for example, for data-centric systems. One computer-implemented method includes identifying a source dataset from a source database for performing a performance evaluation, extracting a schema defining the source database, analyzing data within the source dataset to generate a value model, the value model describing features of data in each column of each table of the source dataset, analyzing data within the source database to determine data dependency, and generating a data specification file combining the extracted schema, the value model, and the data dependencies.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, wherein determining data dependency comprises determining one or more of inter-table dependency, intra-table dependency, or inter-column dependency of data within the source database.

A second aspect, combinable with any of the previous aspects, comprising storing the data specification file in a database or writing the data specification file in a file accessible by a user.

A third aspect, combinable with any of the previous aspects, comprising generating synthetic data based on the data specification file, wherein the generated synthetic data corresponds to the extracted schema of the source database, wherein the generated synthetic data corresponds to the generated value model of the source database, wherein the generated synthetic data corresponds to the determined data dependency, and wherein the generated synthetic data includes different data than the analyzed data within the source database.

A fourth aspect, combinable with any of the previous aspects, wherein the generated synthetic data has a smaller size, a same size, or a larger size than the analyzed data.

A fifth aspect, combinable with any of the previous aspects, wherein generating synthetic data comprises identifying a data source, identifying a value model for the synthetic data based on the generated value model of the source database, generating a composite value model based on the determined data dependency, and generating row values of the synthetic data based on the data source, the value model, and the composite value model.

A sixth aspect, combinable with any of the previous aspects, wherein generating synthetic data comprises generating a foreign key graph, and generating a data tables in an order according to the foreign key graph.

The subject matter described in this specification can be implemented in particular implementations so as to realize one or more of the following advantages. First, the example techniques and tools for generating synthetic data can support complex database schema and can generate "close-to-real" synthetic data focusing on the effects of data on the performance behavior of its target application. Second, the example techniques and tools can automatically generate large volumes of synthetic data based on a manually created (e.g., by a performance analyst or application developer) or automatically extracted data specification that captures the essence of the data to be generated. Third, the combination of the data extraction and generation process, together with the ability to capture complex data dependencies, make the example data extraction and generation (DEG) tool a desirable solution to a variety of use cases in the development of data-centric applications. For example, in cases where access to real customer data is limited (for performance testing), DEG can be used to extract the performance relevant characteristics of the data and generate large volumes of synthetic data that mimic the performance effect of "real" customer data on the target application. The example techniques and tools described herein can be applied and reusable in broad contexts for various applications, not limited to specialized functionality or context. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 6 is a sample code illustrating an example method for analyzing existing data in source database to identify data characteristics relevant for performance evaluation according to an implementation.

FIG. 8 is a sample code illustrating an example method for identifying intra-table and inter-column dependencies according to an implementation.

Like reference numbers and designations in the various drawings indicate like elements according to an implementation.

DETAILED DESCRIPTION

Figure 1:
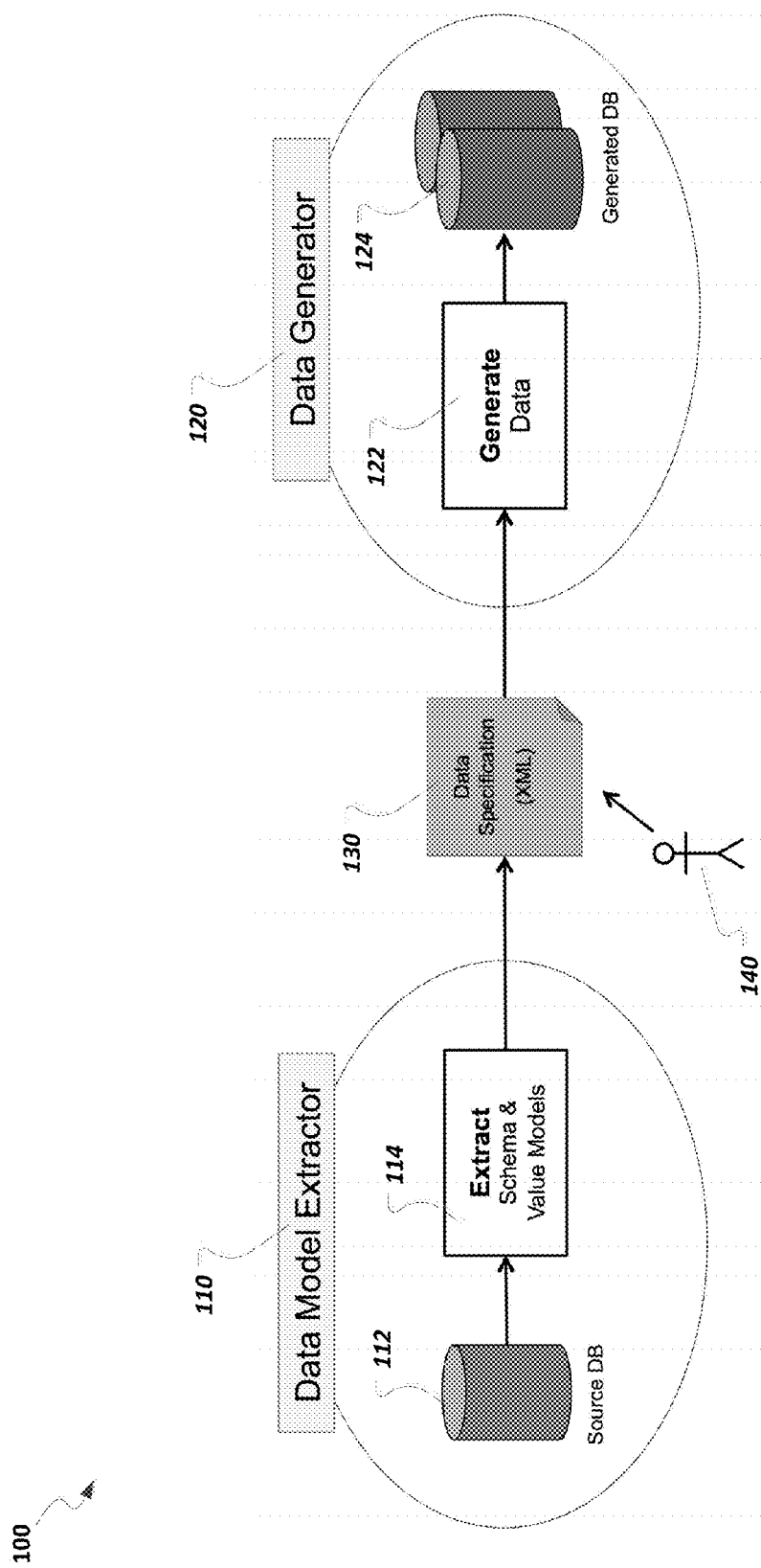
FIG. 1 is block diagram illustrating a system for generating data for performance evaluation of an application according to an implementation.

The following detailed description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

The huge amount of data used by today's business applications induce new challenges for development and testing of data-centric systems. For example, for realistic performance evaluation of the applications, a large amount of close-to-real synthetic data that account for the inherent complexity of the data structures in today's data-centric systems are desirable. Typically, the test data available during the development phase is much smaller than the actual data in the target environment. The example techniques described in this disclosure can automatically analyze existing test data of an application and based on this analysis generate the same size or larger volume of synthetic data that closely simulate "real data" in terms of performance characteristics.

The example techniques can take into account both the existing data (e.g., test data and/or actual customer data) in the source database and the similarity of generated data to source data with respect to their influence on performance behavior of data-centric applications. The example techniques can be implemented as computer-implemented methods, computer-program products, and systems for generating synthetic data for performance evaluation of an application. The example techniques can be applied, among others, in the following scenarios:

(A) There is no test data, but the data semantics and the requirements are known. In this case, domain experts can create a data specification describing the nature of the data together with its internal and external dependencies, based on which large volumes of test data can be generated.

(B) There is only a relatively small test data. In this case, synthetic data in large volumes can be generated based on extracted characteristics of the test data, which can support realistic performance testing and performance prediction of the application.

(C) The customer (real) data is confidential and cannot be used for testing of the application. In this case, synthetic data can be generated with the same performance-relevant characteristics of the real data, which can then be used for testing.

The example techniques can analyze existing data of a data-centric application to extract its performance relevant characteristics, and then generate synthetic data that is close to the real data in terms of performance behavior of the target application. Furthermore, a toolset (referred to as Data Extractor and Generator (DEG)) is developed for extracting data characteristics from a source database and generating data into a destination database. Systematic measurement experiments have been performed to evaluate the generated data in terms of its effect on the performance of the target application. The approach has already been successfully evaluated using a number of case studies.

Data characteristics relevant to performance can be divided in three groups: Schema Constraints, Value Models, and Dependencies. In the following, these categories of data characteristics will be explained and the data characteristics will be introduced.

Schema Constraints

Schema constraints capture the specification of the data schema that has to be created on the target database. These constraints can be divided into two groups, obligatory and non-obligatory constraints.

Obligatory constraints are constraints (or features and/or attributes), without which the data generation is not possible; in other words, the minimum attributes that shape the destination schema. For instance, a generated table needs to have a table name and the generated table should have the same number of columns as of its source table. For columns, the most important constraints include, for example, column name, data type and primary key flag.

The non-obligator constraints are constraints that are not necessary for creating a correct schema but they potentially can play an important role in the performance of the target application. The non-obligatory constraints can be replaced by default values of a database management system (DBMS) if they are not set at the time of data generation. Example non-obligatory constraints include Table Type, Auto Delta Merge, Table Partitioning and Indexes.

Value Models

Value models capture the nature of the data in each table column. Each value model can include a name and a set of parameters, which shape a formal description of values in a column of a data set. Example value models include, for example:

Random Distribution Value Models: value models that generate random data; including Uniform and Gaussian models.

Sequential Value Model: a value model offering sequential numeric, date values, or character string values.

Sample Based Probabilistic Distribution Value Model: a random data value model with a distribution histogram that can be extracted through sampling of the source data.

Constant Value Model: a value model providing constant values.

Pool Value Model: a value model that retrieves the values from a SQL query executed on the destination database.

List Value Model: a value model based on a list of constant values.

Expression Value Model: a value model based on a mathematical or a programming language expression that specifies the values of the column in each row as a function of the values of other columns of the same table or of other tables.

Additional or different value models can be defined and supported by the DEG.

Data Correlations and Dependencies

Most of the data correlations and dependencies in databases are not explicitly defined but usually affect the performance behavior of applications running on the data. These correlations can exist, for example, among data in a table or between two columns of two different tables. The data correlations and dependencies can also impact the value models explained above. For example, if a column is recognized as numeric data type in a range between a minimum and a maximum, the result data could be generated randomly within this range. But assuming there is a strong correlation—say, a foreign key relation—between a referencing or child data set and a referenced or parent data set, the parent data needs to be considered as the only source to generate data for the child; otherwise the generated data may violate the foreign key rules.

In some implementations, the dependencies can be categorized in three groups: Inter Column Dependency, Intra Table Dependency and Inter Table Dependency. The example techniques described herein consider these dependencies, extracts them, and applies them to generate data with better quality with respect to performance behavior.

Inter-Column Dependencies

Inter-Column Dependencies refer to any data dependency between the columns of the same row in the same table. For instance, in Germany the land transfer tax (Grunderwerbsteuer) varies by state, thus the land transfer tax depends on the location of the property. For this reason, if the location of property and the land transfer tax are stored in one table, this correlation needs to be realized.

Intra-Table Dependencies

Intra-Table Dependencies refer to the dependencies between values of different rows within the same data set. Such dependencies happen, for example, in the N-to-1 relationships of normalized schemas and their de-normalized counterparts.

Inter-Table Dependencies

Inter-Table Dependencies refer to the dependencies of two tables that have a parent-child (foreign key) relationship. In such a case, for each value in the foreign key column of the child table, a primary key value in the parent table can exist. The classical example of inter table dependency is referential integrity (RI) which is usually called Foreign Key (FK) relations.

Foreign Key Graph

Before data generation, a Foreign Key Graph can be built, for example, by the DEG. A foreign key graph is a directed graph, in which the tables are nodes and foreign key relations are edges. In some instances, the foreign key graph needs to be a Directed Acyclic Graph (DAG), otherwise it may lead to a deadlock. Building such a graph can, for example, facilitate finding probable contradictions in foreign key relations. In addition, the data generation of tables needs to be done in the right order. In other words, the parent tables should be generated before child tables. The reason is, the child tables need to read the foreign key values from parent tables, thus the order of creating tables and data generation is important.

Extended Schema

The extracted data characteristics can be stored in a data model and then persisted in file system or database. As such, the extracted data can be reusable with minimum effort, if the machine, database or any other underlying infrastructure is changed. In some instances, it would be more simple and easier for the performance analyst to read the extracted information in a file or database than objects in memory. In some implementations, the extracted information can be modified, customized, or otherwise managed by the users.

In some implementations, the example techniques described herein include extracting the characteristics of a source dataset (from a database) that are relevant for the performance of one or more applications that will use the dataset. Example characteristics include, but not limited to, the database schema defining the source database, value models capturing the features of data in each column of each table in the source database, data dependencies including, but not limited to, inter-table, intra-table, and inter-column dependencies. A data specification file with zero or more sample data files can be generated based on the extracted characteristics. The data specification file can combine the extracted schema, the value models, and the data dependencies. An artificial or synthetic dataset (with a smaller, the same, or larger size than the source dataset) can be generated using the generated data specification file. The synthetic dataset can mimic the same performance-relevant characteristics of the source dataset for the purpose of performance evaluation of applications.

FIG. 1 is a block diagram illustrating an example system 100 for generating data for performance evaluation of an application according to an implementation. The example system 100 can represent the Data Extractor and Generator (DEG) toolkit that can perform schema extraction, data model extraction, maintenance of the extracted information, data generation, and other functionalities associated with data generation for performance evaluation of an application.

As illustrated, the example system 100 includes a data model extractor 110 and a data generator 120. The example system 100 can include or be communicably coupled with additional modules or components of the example system 100. The data model extractor 110 and data generator 120 can be implemented, for example, as software module, hardware module, enterprise application, application programming interface (API), or a combination of these and other types of function blocks. Although illustrated as two separate modules in FIG. 1, the data model extractor 110 and a data generator 120 may be integrated together according to particular needs, desires, or particular implementations of the example system 100.

The data model extractor 110 can be responsible for schema and data model extraction. For example, the data model extractor 110 can extract the schema from a source database (DB) 112. All the obligatory and non-obligatory schema constraints can be extracted. In addition, the data model extractor 110 can extract value models and data correlation and dependencies, such that the existing data (e.g., from the source database 112) can be abstracted in a way that can be later used to generate data. As an example, the data model extractor 110 can extract table structures, relations between tables and dependencies among data in a table, analyze the source data, extract these performance-relevant characteristics, and summarize them into value models (explained below).

In some implementations, the data model extractor 110 can be divided into or implemented as two sub-modules, data extractor (DE) and data analyzer (DA) (not shown). The DE component can be responsible for extracting the schema with all defined constraints as well as required data. The DA component can analyze the source data in the source database 112 to derive the performance-relevant characteristics. For example, the DA can analyze each column to find a suitable value model for the column and can find different dependencies between tables and columns.

In some implementations, the extracted schema, value models, and data correlations and dependencies can be stored in an extended schema, as an output of the data model extractor 110 accessible for users and other components the example system 100. For instance, the data model extractor 110 can generate a data specification file 130 as an example extended schema that combines the extracted schema and value model. The data specification 130 can be written in JAVA, C++, or other suitable language providing data in extensible markup language (XML) format or other suitable format. In some implementations, a user or a performance analyst 140 can access the data specification file 130 and modify the extracted attributes using, for example, a normal XML editor. As such, maintainability of the extracted information is enabled.

Figure 2:
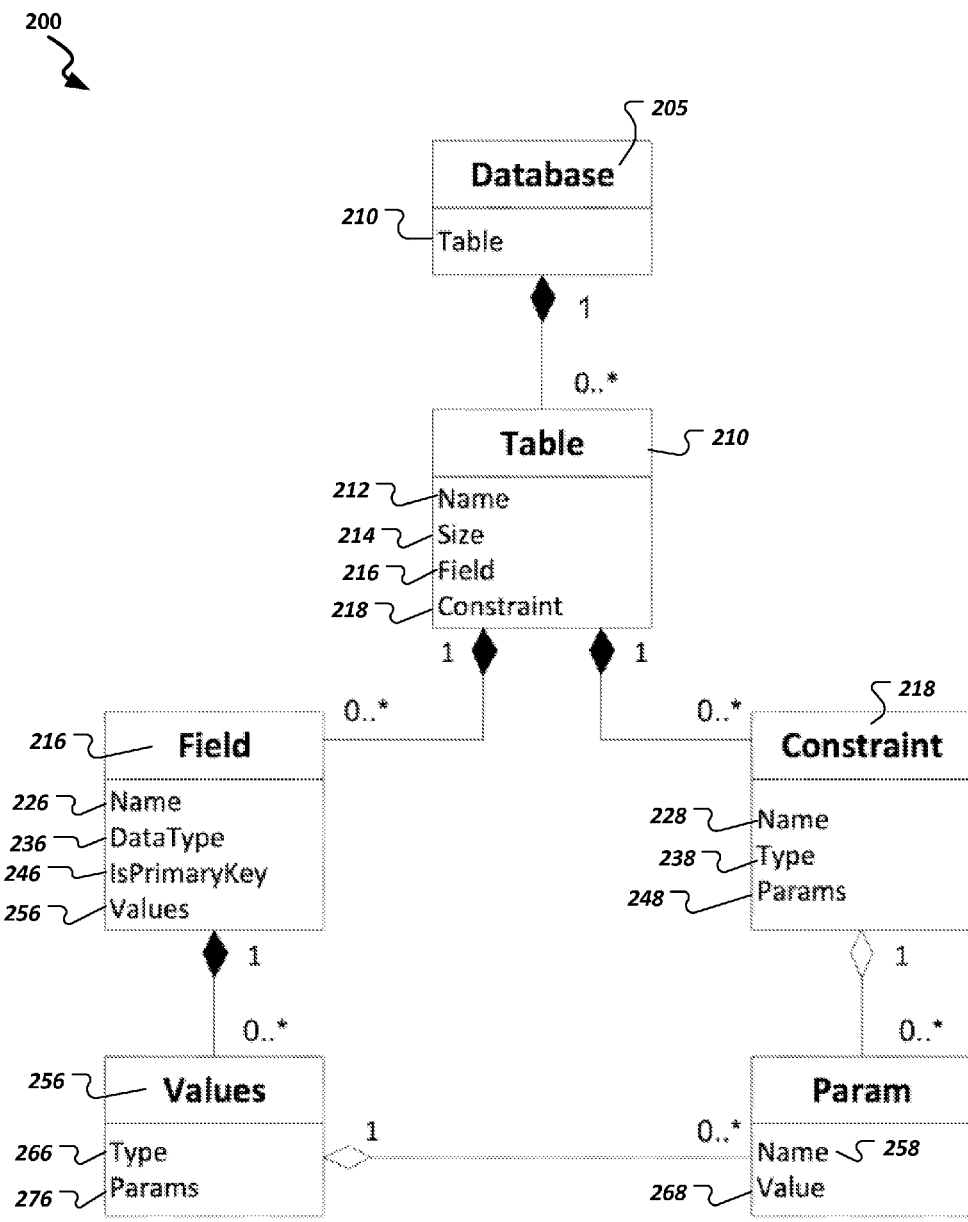
FIG. 2 is a block diagram illustrating an example extended schema model according to an implementation.

FIG. 2 is a block diagram illustrating an example extended schema model 200 using UML standard notations according to an implementation. The example extended schema model 200 includes a high-level data model of extended schemas, which specifies schema, value models, data correlations and dependencies, and other information extracted, for example, based on the source data from the source database 112 of FIG. 1. The extended schema model 200 defines the organization and structure of the source data stored in the source database.

As illustrated, the extended schema model 200 includes extracted information of one or more tables 210 included the source data. For example, the extended schema model 200 includes a Database class 205 that present the entire schema and can include one or more Tables 210. The class Table 210 can represent a table (relation) in relational database. Each Table 210 can include various table attributes, such as, table name 212, table size 214, field 216, and constraint 218. Detailed features of the table attributes can be further specified. As an example, field 216 can represent field or columns of a table. Detailed field attributes of the field 216 can include, for example, field name 226, data type 236, IsPrimaryKey 246, and values 256. The boolean attribute IsPrimaryKey 246 is a primary key flag determines whether a column is primary key or not. The Values 256 is an attribute that contains the value model information and can be referred to as a class. Each field can have zero or more value models. The value model can have one or more Params 276. Param 276 represents parameters used in each value model. In some instances, some value models may not have any parameters. Constraints 218 can represent schema constraints like indexes or can be explicitly defined. Constraints 218 can include detailed attributes such as constraint name 228, type 238, parameters 248 can be specified. In some implementations, detailed parameters attributes, such as, parameter names 258 and respective values of the parameters 268 can be specified, for example, for the Params 276 of the Values 256 and the Params 248 of the Constraint 218.

In some implementations, the extended schema model 200 can include additional or different information indicating the schema, value models, data correlations and dependencies extracted in the source data. The extended schema model 200 outlines the data structure and organization of the source data. Synthetic data can be generated based on the detailed information and structure included in the extended schema model 200.

Referring back to FIG. 1, the data specification file (or extended schema) 130 can be provided, for example, to the data generator 120. The data generator 120 is responsible for generating data based on the information extracted by the data model extractor 110. The generated data can be written directly in a generated or target DB 124 or into a file. The generated data should have similar effect on performance of an application as the source data. The term "similar effect" refers to the "similar influence of data on performance behavior of the application."

For instance, after extracting the data characteristics (e.g., by the data model extractor 110) and arbitrarily adjusting them (e.g., by the user 140), the data generator 120 can generate synthetic data based on the XML specification 130, and output the generated data, for example, by inserting into the database 124 or storing in a comma-separated values (CSV) format file.

Figure 3:
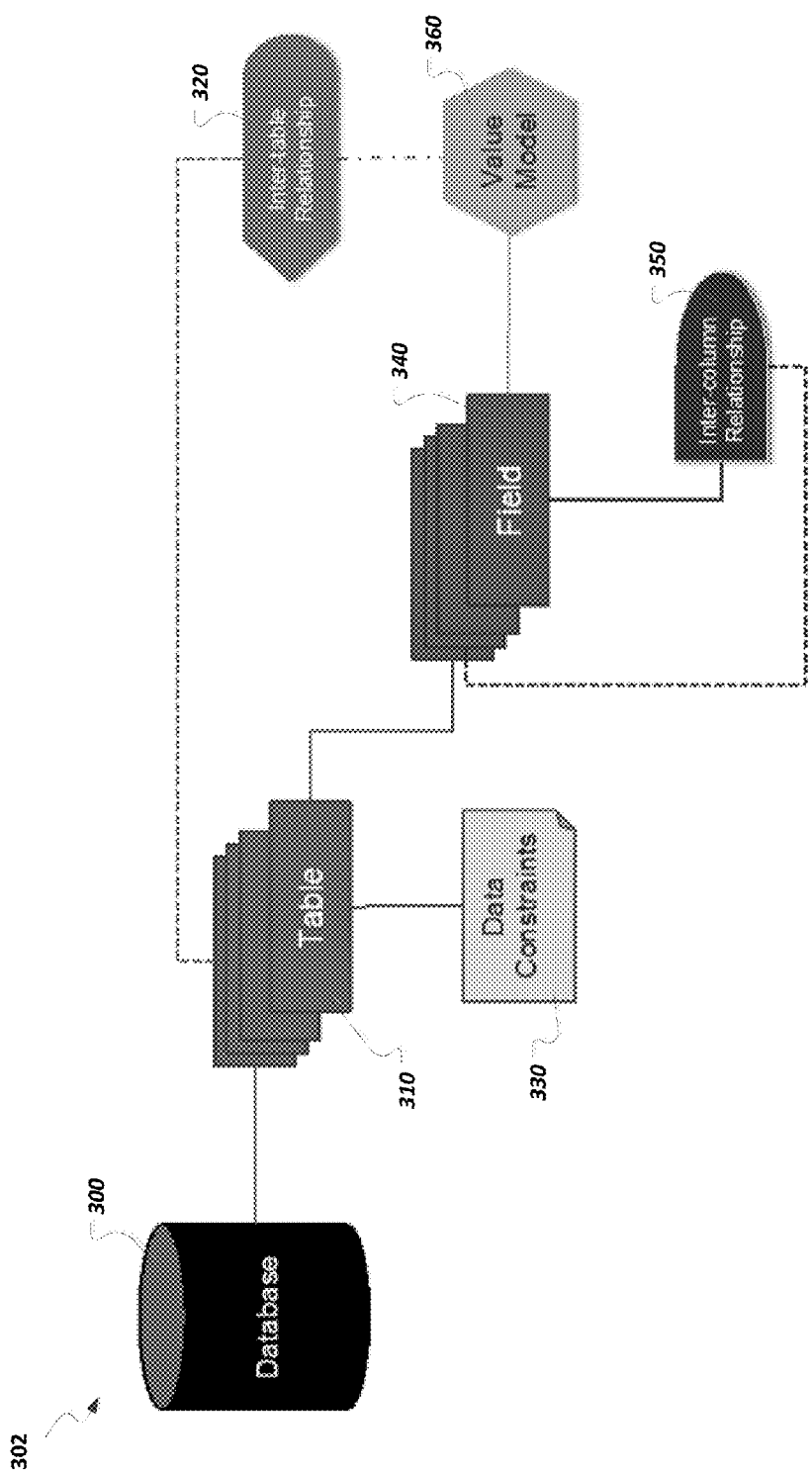
FIG. 3 is a block diagram illustrating a view of a database according to an implementation.

FIG. 3 is a block diagram 302 illustrating an example view of a database 300, for example, from the perspective of the DEG or another system for generating data for performance evaluation according to an implementation. The database 300 can be a relational database or another type of database. The database 300 can be, for example, the source database 113 or the generated database 134 in FIG. 1.

The database 300 includes a collection of tables 310. Two or more tables 310 can be related by an inter-table relationship (or dependency) 320. For example, two tables can have a parent-child (foreign key) relationship such that a foreign key (e.g., a field or a collection of fields) in one table uniquely identifies a row of another table. The inter-table relationship 320 can also include a foreign key (e.g., a column or a combination of columns) that is used to establish and enforce a link between two tables, and the tables can be cross-referenced by the inter-table relationship 320. In some implementations, a Foreign Key Graph can be built to reflect the inter-table relationships of the multiple tables 310 in the database 300.

The multiple tables 310 can be governed by data constraints (or schema constraints) 330 that define the organization of data in the database 300. For example, the data constraints 330 can include obligatory and non-obligatory constraints and specify tables, columns, data types, or other features of the database 300.

The multiple tables 310 can each include a number of fields or columns 340. Two or more columns can be related by inter-column relationship or dependency 350. The inter-column relationship can be any data dependency among data entries of the columns. As an example, the data of two columns can be proportional or otherwise correlated. The proportionality or other correlations between the data of the two columns and be extracted and included in the inter-column relationship 350.

The characteristics of data in the fields 340 can be described by one or more value models 360. In some implementations, the inter-table relationship 320, the inter-column relationship 350 can be incorporated into the value models 360 to capture the distribution, value range, or other characterizes of the data in the fields 340. The value models 340 can be used, for example, by the data generator 120 of FIG. 1 to generate values of synthetic data.

Figure 4A:
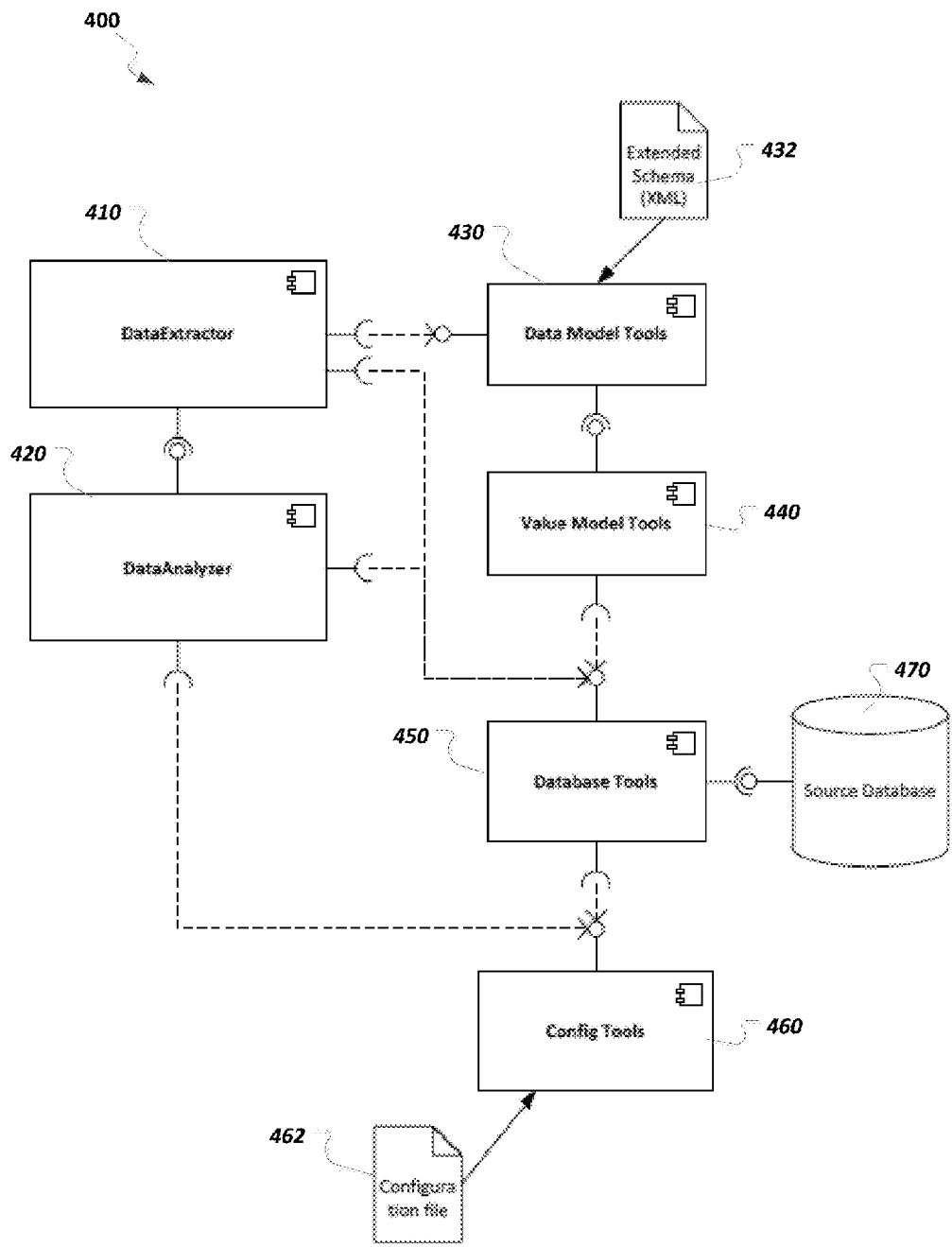
FIG. 4A is a block diagram illustrating architecture of an example data extraction subsystem.
Figure 4B:
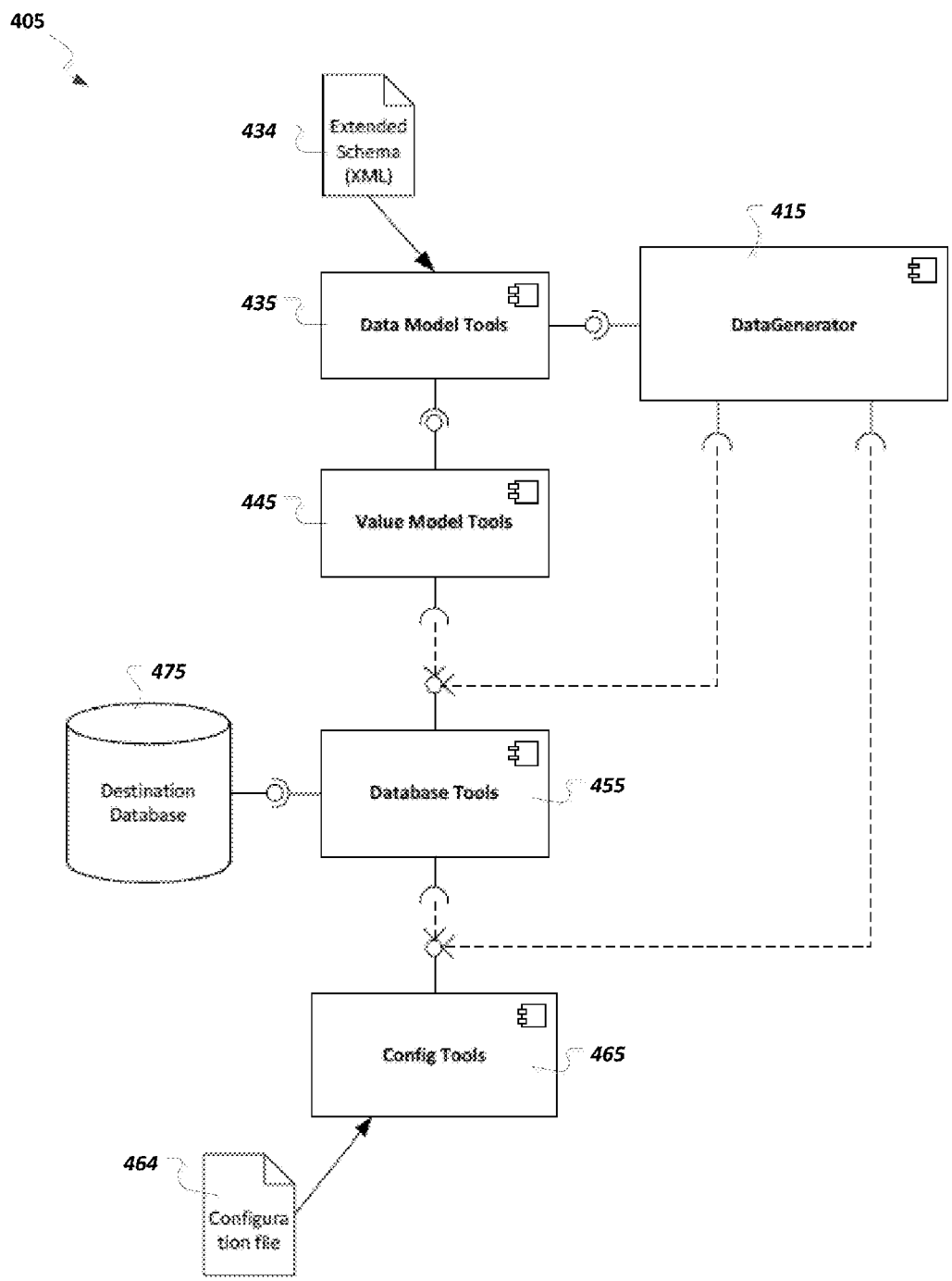
FIG. 4B is a block diagram illustrating architecture of an example data generation subsystem according to an implementation.

FIG. 4A is a block diagram illustrating architecture of an example data extraction subsystem 400 according to an implementation; FIG. 4B is a block diagram illustrating architecture of an example data generation subsystem 405 according to an implementation. The data extraction subsystem 400 can be the example data model extractor 110 of FIG. 1 or another module for extraction information from source data. The data generation subsystem 405 can be the data generator 120 of FIG. 1, or another data generation module for generating synthetic data. The combination of the example data extraction subsystem 400 and the example data generation subsystem 405 can form the overall system of the DEG.

The example data extraction subsystem 400 includes a data extractor (DE) 410 and a data analyzer (DA) 420 communicably coupled with data model tools (DMTs) 430, value model tools (VMTs) 440, database tools (DBTs) 450, and configuration tools 460. The DE component 410 is responsible for extracting the schema with all defined constraints as well as required data. For example, schema constraints can be derived by the DE 410 from meta data of the source database (e.g., an in-memory database, a traditional database, etc.). The DE 410 can use DBT 450 in order to read required information, such as schema constraints, from source database 470. DBT 450 is responsible for database (DB) operations, reading from source database 470 and read/write from/in destination database (e.g., destination database 475 in FIG. 4B) as well. In some implementations, the DE 410 can let the DA 420 to analyze each column to derive a suitable value model. The DA 420 can analyze and identify data relationships and dependencies.

The DMT 430 can provide an interface for accessing the data structure, creating and reading the data models (e.g., extended schema 432). In some implementations, the DMT 430 uses the VMTs 440 to create the required value models. During the extraction phase, the required parameters for the VMTs 440 can be gathered. The VMTs 440 can produce the value models in an appropriate format. The VMTs 440 can also be used, for example, by the DE 410, to read already produced value models.

The example data generator subsystem 405 includes a data generator (DG) 415 communicably coupled with data model tools (DMTs) 435, value model tools (VMTs) 445, database tools (DBTs) 455, and configuration tools 465. The DMTs 435, VMTs 445, DBTs 455 and configuration tools 465 can be the same DMTs 430, VMTs 440, DBTs 450 and configuration tools 460 of the data extraction subsystem 400 in FIG. 4A (e.g., the data extraction subsystem 400 and the data generation subsystem 405 share the same tools and modules), or one or more of the tools can be different (e.g., implemented as separated or independent tools or modules).

The DG 415 can use DMTs 435, DBTs 455, and configuration tools 465 to generate synthetic data. The DG 415 can use the VMTs 445 to generate values based on the parameters of the value models and take into account the dependencies during the generation phase.

The configuration tools 460 and 465 can be used by other components and tools of the example data extraction subsystem 400 and the example data generation subsystem 405, for example, to read the required parameters from configuration files 462 and 464 for extracting and generating the data, respectively. The configuration files 462 and 464 can store, for example, connection information of source DB 470 and destination DB 475, different thresholds, variables set by user and required tables, or other information. Such information is not likely to be changed during the runtime, therefore can be stored in the configuration files 462 and 464 and loaded once for the sake of efficiency.

Figure 5:
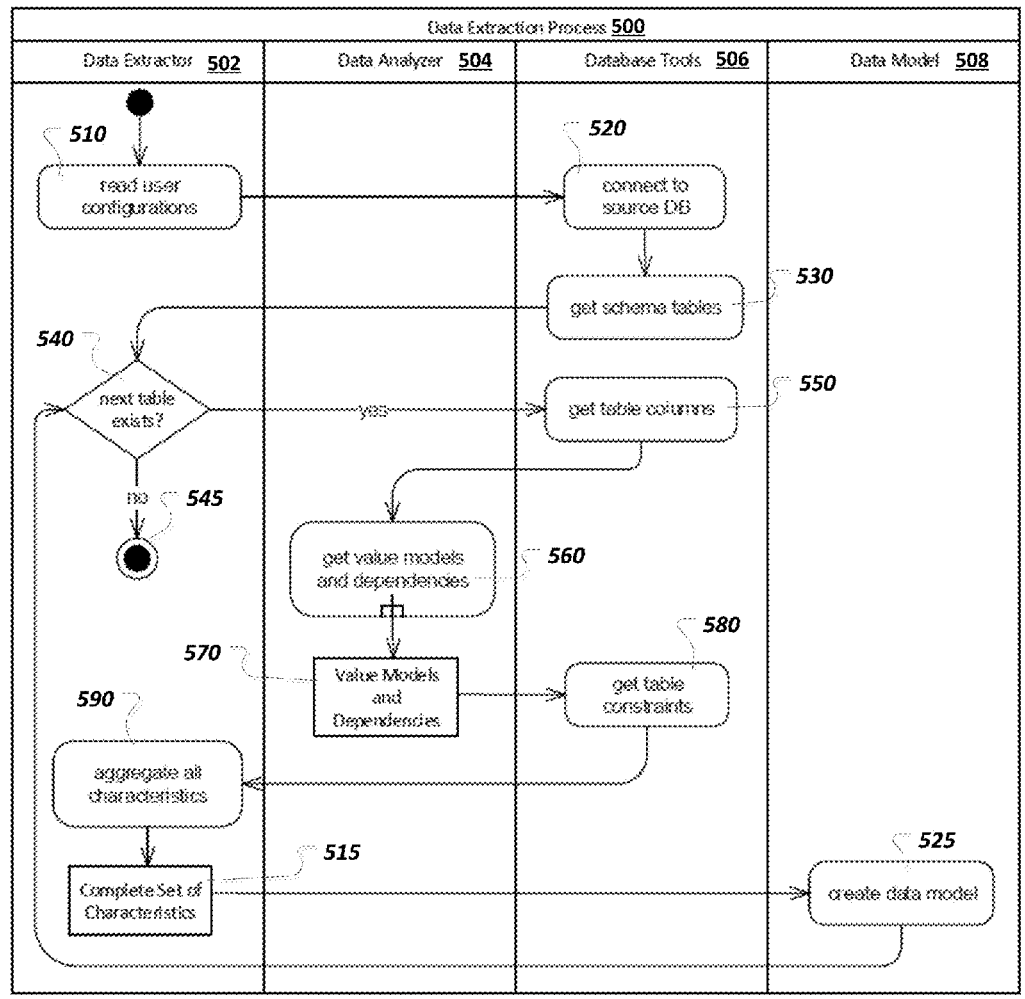
FIG. 5 is a flow chart illustrating a method for performing data extraction according to an implementation.

FIG. 5 is a flow chart illustrating a method 500 for performing data extraction according to an implementation. For clarity of presentation, the description that follows generally describes method 500 in the context of FIG. 4A. For example, the method 500 describes the operations among the data extractor (DE) 502, data analyzer (DA) 504, database tools (DBTs) 506, and data model tools (DMTs) 508, which can be the DE 410, DA 420, DBTs 450, and DMTs 430 of FIG. 4A, respectively. However, it will be understood that method 500 may be performed, for example, by any other suitable system, environment, software, and hardware, or a combination of systems, environments, software, and hardware as appropriate. In some implementations, various steps of method 500 can be run in parallel, in combination, in loops, and/or in any order.

At 510, the DE 502 reads user configuration and/or environment specification, for example, from a configuration file (e.g., the configuration file 462 in FIG. 4A). Then the DE 502 passes the required connection information to the DBTs 506.

At 520, the DBTs 506 establishes the connection to source database (e.g., the source database 470 in FIG. 4A) and reads the tables from database at 530. In some implementations, if the required tables are defined in configuration file, then only those tables will be read, otherwise the entire tables in given schema can be read.

At 540, whether a next table exists can be determined, for example, by the DE 502. If no next table exists (e.g., all (required) tables have been read), the example method 500 stops. Otherwise, the example method 500 proceeds to 550.

At 550, table fields (columns) can be read, for example, by the DBTs 506, if any table is read from the database. The columns with all constraints can be passed to the DA 502.

At 560, the DA 502 analyzes each table column and identifies proper value models for each column and data dependencies. Example techniques for identifying value models and dependencies will be described in greater detail as below.

At 570, the DA 502 passes the analyzed information (value models and data dependencies) to the DBTs 506.

At 580, the DBTs 506 adds the analyzed information to column constraints.

At 590, the DE 502 puts all the extracted data together and at 515 sends the aggregated or complete set of characteristics (e.g., schema constraints, value models, data dependencies) to the DMTs 508.

At 525, the DMTs 508 creates the data model, which matches the extended schema. This process will be continued until all the tables are read. The extracted information can be then written into an extended schema instance.

The Data Analyzer (e.g., the DA 420 or 504) component can perform two main tasks: finding a suitable value model for every column, and finding dependencies in the data at column and table levels. FIG. 6 is a sample code illustrating an example method 600 for analyzing existing data in the source database to identify data characteristics relevant for performance evaluation according to an implementation. The example method 600 includes:

1. Find schema constraints on the source data tables and columns.
2. For each column, detect the value model based on various indicators such as the type of data, distinct count of values in each column, the queried relationship in the modeled views of the source database, etc.
   a. For each column x of table T, first the distinct count of the values of column T.x is calculated ($DC_{T.x}$). A $DC_{T.x}$ value of 1 means that the column a constant value.
   b. If the $DC_{T.x}$ is greater than 1, DA checks if the column is a primary key and has a numeric data type. If it is the case, then its value model is assumed to be a sequence value model in order to generate unique data that follow the primary key constraint.
   c. Otherwise, if the Foreign Key flag is set in the configuration of DEG, the DA component checks for the foreign key detection flag in the configuration file. If it has been set to true, then a list of candidates for foreign key mappings is retrieved (the method getForeignKeys( ) below). If the returned set of FKs is not empty (or null), then the foreign key value model will be created for the column.

d. Otherwise, the ratio of distinct count of the column to the table size (row count) will be calculated and compared with a sampling threshold defined by the user. If this ratio is less than or equal to sampling threshold, it will assign a Sample Based Value Model to the column and samples the values.

e. Finally, if no value model is found, the value model will be set to Uniform Value Model.

3. Extract inter-column and intra-table dependencies if their appropriate flag is set in the DEG configuration file.

There are two example approaches for extracting inter-table dependencies (ITD, or foreign key mappings), query driven and data driven. In query driven techniques, query workloads can be used to discover the inter-table relationships by investigating the existing join operators in the queries. For example, a join operation of the form A.x→B.y, indicates a possible relationship between column x of table A and column y of table B. Here, one challenge is to have the right set of queries. In certain databases, such as an in-memory database, one can look into the cache of all the join operators that are used in deployed database views. These operators also indicate potential relationships between tables (and their columns) On the other hand, the data driven techniques can use some heuristics to compare the values of different columns in different tables in order to find the inclusion dependencies. They use either samples or the whole data and perform tests to check if two columns have inclusion (Foreign Key) dependency or not.

However, in some cases, looking at existing join operations to find ITDs is not sufficient. Therefore, the candidates can be pruned by means of data driven methods. Based on pruning methods while assuming {A.x} and {B.y} are sets of unique values of columns A.x and B.y, the following Pruning Rules (PR) can be defined, i.e., an ITD between A.x and B.y will not be considered, if 1. there is at least one value from column A.x which does not exist in B.y; the only exception is null value, because if the A.x is nullable, then some rows may not have values. Formally, if $\{A.x\} \cup \{\emptyset\} \not\subseteq \{B.y\}$, then the candidate will be pruned.

2. all the values of B.y exist in A.x and the size of B is greater than the size of A. Formally, if $\{A.x\} \cup \{\emptyset\} = \{B.y\}$ and #B>#A.

3. all values of B.y do not exist in A.x, size of A is greater than the size of B and the ratio of unique values of A.x in compare to unique values of B.y is less than a threshold. Formally, if $\{A.x\} \cup \{\emptyset\} \neq \{B.y\}$, #A>#B and $$\frac{A \cdot x}{B \cdot y} < \alpha,$$

where $\alpha$ is a threshold.

4. all the values of B.y do not exist in A.x, size of A is less than or equal to the size of B, and the ratio of unique values of A.x in compare to unique values of B.y is less than a threshold. Formally, if $\{A.x\} \cup \{\emptyset\} \neq \{B.y\}$, #A≤#B and $$\left(\frac{A \cdot x}{\#A}\right) / \left(\frac{B \cdot y}{\#B}\right) < \alpha,$$

where $\alpha$ is a threshold determined by a performance analyst.

Figure 7:
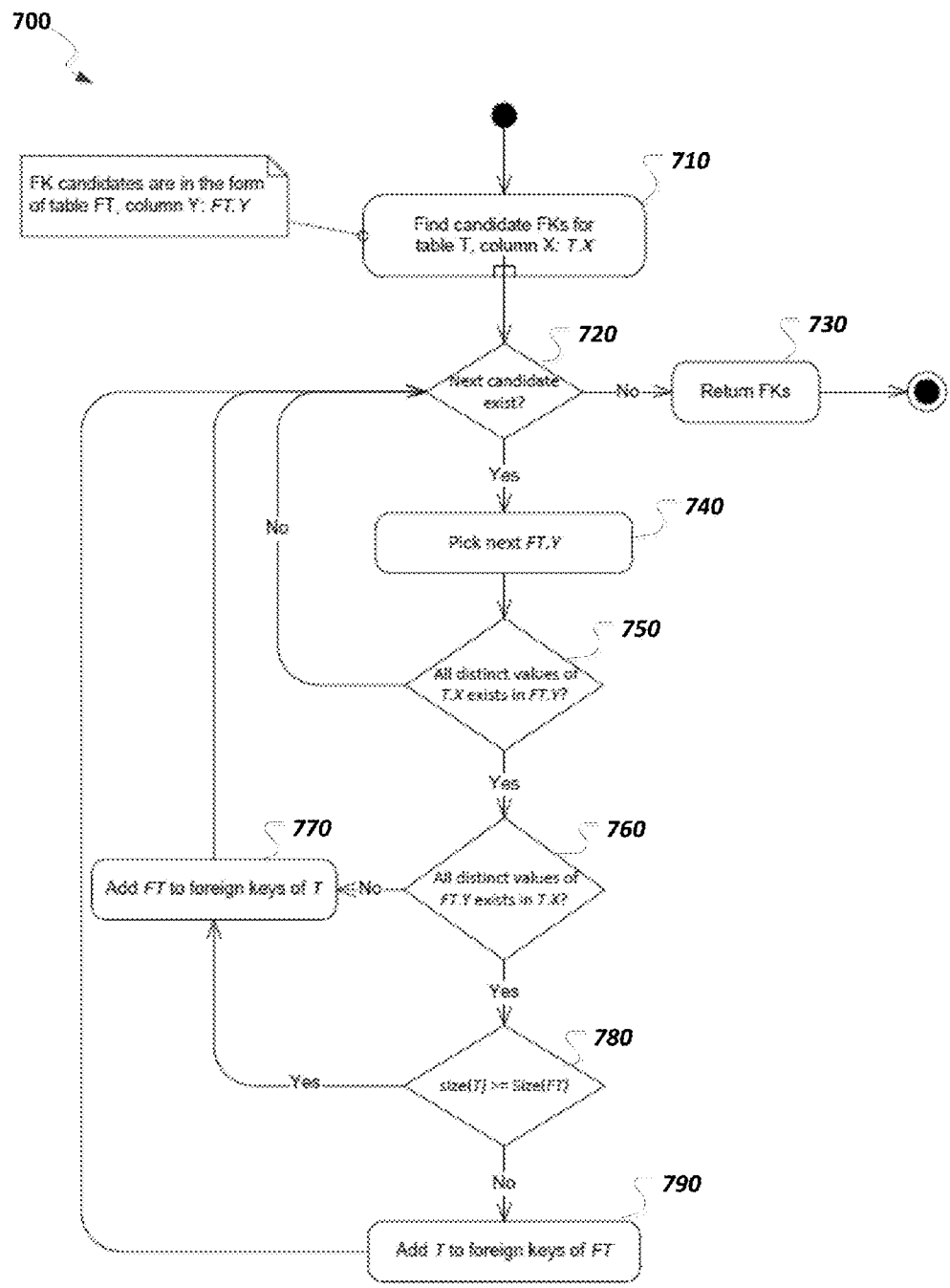
FIG. 7 is a flow chart illustrating an example method for determining inter-table dependencies of data according to an implementation.

FIG. 7 is a flow chart illustrating an example method 700 for determining inter-table dependencies (foreign key) of data according to an implementation. The example method 700 uses the example pruning techniques as described above. For example, foreign keys of two tables, Tables T and FT, can be identified according to the example method 700.

At 710, foreign key (FK) candidates of a table can be identified. For example, an FK candidate, Column X, of Table T can be identified and denoted as T: X. In some implementations, the candidates can be identified, for example, by extracting them from join views stored in meta data of the database (e.g., an in-memory database).

At 720, whether another FK candidate exists between the two tables can be determined. If all FK candidates have been identified, the currently identified FKs can be output at 730 and the example method 700 stops afterwards 7. Otherwise, the example method 700 proceeds to 7740.

At 740, the next candidate, an FK candidate, Column Y, of another table, Table FT, is selected to be analyzed.

At 750, the set of distinct values of Column Y of table FT is compared to the set of distinct values of Column X of Table T. If the former set is a superset of the latter, the method continues to 760. Otherwise the candidate is discarded (pruned) and the method continues with checking other candidates at 720.

At 760, it is determined if the set of all distinct values of Column Y of Table FT (our foreign key candidate) is a subset of all distinct values of Column X of Table T. If not, then it adds Column Y of Table FT as a foreign key for Column X of Table T in 770 and the method moves on to the next candidate. Otherwise, the method still needs to do one more check at 780.

At 780, the sizes (row counts) of Tables T and FT are determined. If the size of Table T is larger than Table FT, then Table FT is considered a foreign key table for Table T at 770. Otherwise, Table T is considered a foreign key table for Table FT.

The extracted information can be stored as a value model in the extended schema specification, because ITD columns do not need anything other than the foreign key information. Thus, a value model called Foreign Key Value Model (FKVM) can be built.

In some implementations, for some databases, foreign keys may not be explicitly defined in schema definitions; the example techniques can first find "candidates" by looking into all JOIN operators in existing database Views and considers join columns as indications for foreign key relationships.

FIG. 8 is a sample code illustrating an example method 800 for identifying intra-table and inter-column dependencies according to an implementation. The example method 800 can be implemented, for example, as step 3 of the example data analyzer method 600. To extract Inter-Column Dependencies (ICD) in a table, a measurement called Inter-Column Dependency Ratio (ICDR) can be used, which is determined by following statement:

$$ICDRC_{1 \rightarrow C_2} = \frac{|C_1|}{|C_1, C_2|}$$

where $ICDRC_{1 \rightarrow C_2}$ is the dependency ratio of values in column $C_1$ to the values in column $C_2$, $|C_1|$ is the number of unique values in column $C_1$ and $|C_1, C_2|$ is the number of unique values of the concatenation of both columns. The ICDR can be checked for every candidate column. If $ICDRC_{1 \to C_2}=1$, it means that the values of $C_1$ absolutely determine the values of $C_2$. It can be suggested to use 1-ϵ, where ϵ can be constant set by the performance analyst, instead of absolute 1. After checking the $ICDRC_{1 \to C_2}$, the $ICDRC_{2 \to C_1}$, can be also calculated. If $ICDRC_{2 \to C_1}=1$, then it means both columns determine each other, otherwise $C_2$ has a One To One Dependency (OTOD) on $C_1$. The former case can be referred to as Twin Dependency. Although twin dependencies happen seldom, the algorithm has been improved to detect them.

To extract Intra-Table Dependencies (IATD), the below condition can be checked to examine whether two columns. $c_i$; and $c_k$ are candidates for IATD:

getDistrictCount(concat($T.c_k, T.c_i$))=$T$.getTableSize$I()$

If this condition is true, it means that columns $c_i$ and $c_k$ build a unique key for the entire table or formally |$c_i$, $c_k$|=tableSize and it can be considered as a case of One-to-N Dependency (OTND). Accordingly, the ICDRs for both columns ICDR-$C_{i \to C_k}$, are less than one. In this case, the column with more unique values has larger ICDR which determines the values of the other column. Thus, it can be enough just to compare the number of unique values of two columns with $$IATDR = \frac{|C_i|}{C_k}.$$

If IATDR is less than 1, then column $C_k$ determines the values of $C_i$, otherwise $C_i$ determines the values of $C_k$ Ck. If they have the same number of unique values, it is not important which one is selected as dependent column, so the first column can be chosen.

It is possible to generalize the OTND to check more columns at once (e.g., three columns or more). Alternatively, the extraction methods can be improved to find dependencies between pair of columns. Nevertheless, there may be some tables that contain primary keys (PKs) based on more than two columns. In order to resolve the primary key violation problem, we can either rely on column pair dependencies like what we explained above or generate values in a way that the concatenations of values of all columns remain unique. The latter solution can be referred to as Multiple Dependency (MD).

Figure 9:
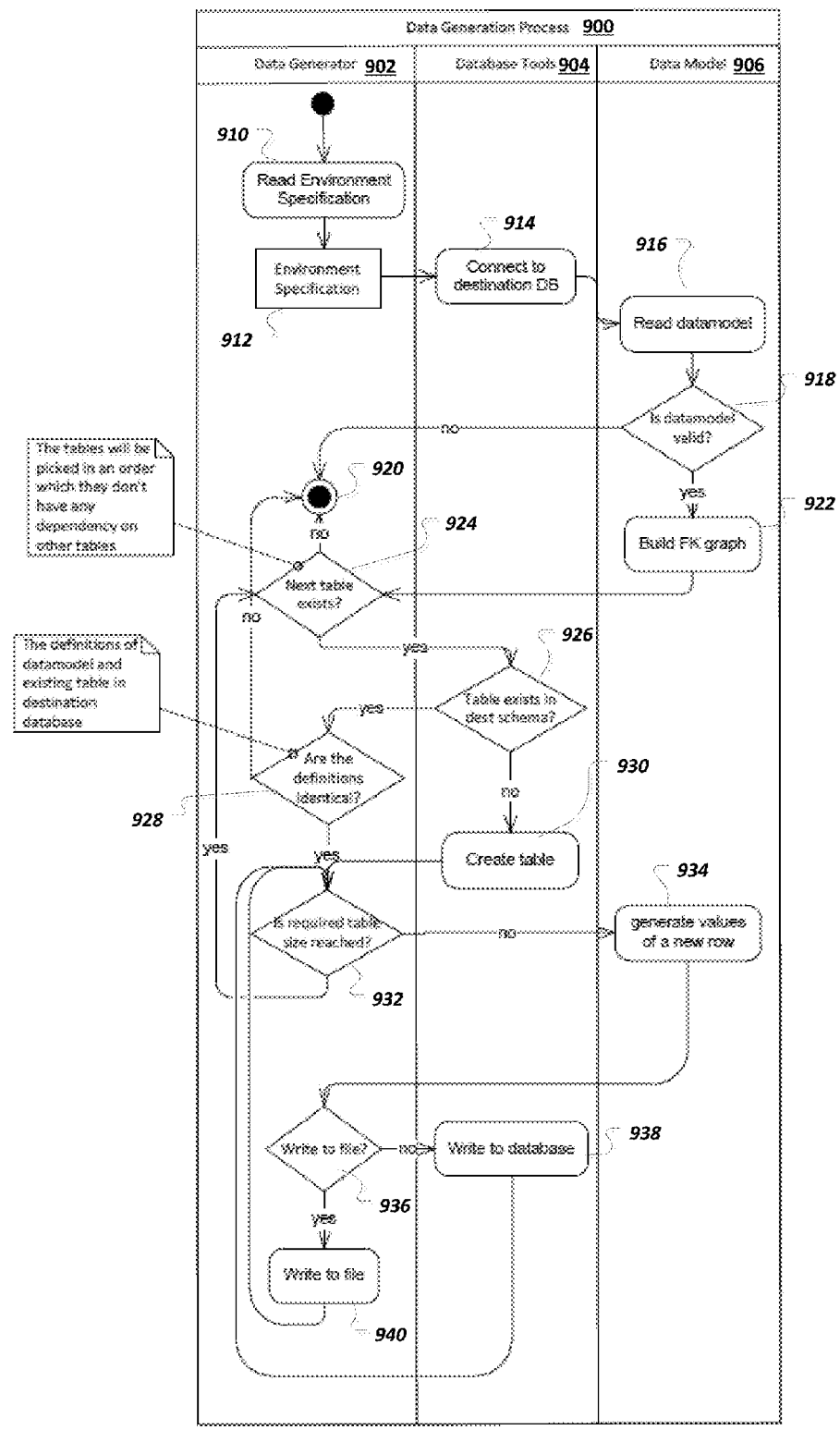
FIG. 9 is a flow chart illustrating an example method for generating data for performance evaluation according to an implementation.

FIG. 9 is a flow chart illustrating an example method 900 for generating data based on extracted data characteristics for performance evaluation according to an implementation. For clarity of presentation, the description that follows generally describes method 900 in the context of FIG. 4B. For example, the method 900 describes the operations among the data extractor (DG) 902, database tools (DBTs) 904, and data model tools (DMTs) 906, which can be the DG 415, DBTs 455, and DMTs 435 of FIG. 4B, respectively. However, it will be understood that method 900 may be performed, for example, by any other suitable system, environment, software, and hardware, or a combination of systems, environments, software, and hardware as appropriate. In some implementations, various steps of method 900 can be run in parallel, in combination, in loops, and/or in any order.

At 910, the DG 902 reads user configuration and/or environment specification, for example, from a configuration file (e.g., the configuration file 464 in FIG. 4B).

At 912, the DG 902 pass the user configuration and/or environment specification to the DBT 904, and set up the DBT 904 to establish the connection to the destination database (e.g., the destination database 475 in FIG. 4B).

At 914, the DBT 904 connects to the destination database.

At 916, the DMT 906 reads the extended schema (e.g., the extended schema 432/434 generated by the data extraction subsystem 400) and builds the data model (e.g., a data structure complied with the specifications of the extended schema). The data model is then validated at 918 for internal and external consistency (e.g., whether the data model matches the existing tables in the destination database). When the data model is determined as validated at 918, the DMT 906 can create a value model instance for each column.

At 922, after the validation and creation of data model, the foreign key (FK) graph can be built by the DMT 906. FK graph can be a directed graph, in which the tables are nodes and foreign key relation are edges. Tables can be generated in an order based on the FK graph. For example, the parent tables can be generated before the children tables because the children tables need to read the foreign key values from parent tables.

At 924, whether a next table exists can be determined. If there exists another table to be generated, a table can be picked to generate data. In some implementations, the table can be picked in an order which they do not have any dependency on other tables.

At 924, the DG 902 checks whether the selected table exists in the destination DB. If the table does not exist, then it can be created with the given specification from the extended schema at 930; otherwise the given specification and the one of the existing table can be compared at 528. If the two specifications are not the same, the example method 900 will end at 920 and the DG 902 will not continue data generation.

If the two specifications are identical, at 934, the DG 902 or the DMT 906 can start generating data that comply with the schema constraints, value models, and data dependencies specified in the extended schema, until the required size for each target table is reached (determined at 932).

At 936, a decision can be made to determine whether to write the generated data into the destination DB or into a file that is set by the user. Accordingly, the generated can be written into the destination database at 938 or written into a file at 940.

In some implementations, to improve the efficiency of data generation, the parallel threads can be used. For example, the DG generates a certain number of records (or batch) and then passes them to the parallel handler to manage it. The parallel handler can write the batch into a file or a database depending on the settings. The batch size could optionally be set by the user, in order to reach the maximum efficiency.

In some implementations, for every column of each table, a Data Source can be created or identified that models the nature of the data in that column (e.g., character string values with a given pattern). On top of a Data Source, a Value Model can be determined to encapsulate how values are selected from the given data source (e.g., randomly or sequential), and how and when the data source to be reset. To model data dependencies between columns, a Composite Value Model may be created around a value model to control the values generated by the value model so that they comply with the relationship requirements. For instance, the Composite Value Model can drive the value model to generate valued according to identified data dependencies of the source data. Row Constraints can capture higher-level constraints on multiple rows (such as primary key constraint)

and describe the constraints over the values in a row. A Row Generator can orchestrate all these components to iteratively generate row values for every table.

Row values of the synthetic data can be generated based on the data source, the value model, the composite value model, and a dependency graph (a foreign key graph). For example, for every table to be generated, the appropriate data sources, value models, and if needed, composite value model elements for each column of the table can be created, for example, by the data generation module or subsystem 120 or 405. A dependency graph can be then generated to capture the intra-table and inter-column dependencies. The graph is traversed from zero-in-degree nodes to generate values for columns. For every row value, row constraints can be checked and if validated, the row is passed to be inserted into the table. If a row constraint fails, depending on the constraint definition and the characteristics of the data in the affected columns, new values for the affected columns can be generated.

The generated data for the tables can be either stored in CSV files (to be manually imported to the database) or inserted directly to the database, for example, using a Java Database Connectivity (JDBC) driver. The generated data can be used, for example, in a test environment for evaluating performances of an application.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method executed by one or more processors, the method comprising:
   identifying a source dataset from a source database;
   extracting a schema defining the source database;
   analyzing data within the source dataset to generate a value model, the value model describing features of data in each column of each table of the source dataset;
   analyzing data within the source database to determine data dependency; and
   generating a data specification file combining the extracted schema, the value model, and the data dependencies.

2. The method of claim 1, wherein determining data dependency comprises determining one or more of inter-table dependency, intra-table dependency, or inter-column dependency of data within the source database.

3. The method of claim 1, comprising storing the data specification file in a database or writing the data specification file in a file accessible by a user.

4. The method of claim 1, comprising generating synthetic data based on the data specification file, wherein the generated synthetic data corresponds to the extracted schema of the source database, wherein the generated synthetic data corresponds to the generated value model of the source database, wherein the generated synthetic data corresponds to the determined data dependency, and wherein the generated synthetic data includes different data than the analyzed data within the source database.

5. The method of claim 4, wherein the generated synthetic data has a smaller size, a same size, or a larger size than the analyzed data.

6. The method of claim 4, wherein generating synthetic data comprises:
   identifying a data source;
   identifying a value model for the synthetic data based on the generated value model of the source database;
   generating a composite value model based on the determined data dependency; and
   generating row values of the synthetic data based on the data source, the value model, and the composite value model.

7. The method of claim 4, wherein generating synthetic data comprises:
   generating a foreign key graph; and
   generating a data tables in an order according to the foreign key graph.

8. A non-transitory, computer-readable medium storing computer-readable instructions executable by a computer and configured to:
   identify a source dataset from a source database;
   extract a schema defining the source database;
   analyze data within the source dataset to generate a value model, the value model describing features of data in each column of each table of the source dataset;
   analyze data within the source database to determine data dependency; and
   generate a data specification file combining the extracted schema, the value model, and the data dependencies.

9. The medium of claim 8, wherein determining data dependency comprises determining one or more of inter-table dependency, intra-table dependency, or inter-column dependency of data within the source database.

10. The medium of claim 8, comprising instructions to store the data specification file in a database or write the data specification file in a file accessible by a user.

11. The medium of claim 8, comprising instructions to generate synthetic data based on the data specification file, wherein the generated synthetic data corresponds to the extracted schema of the source database, wherein the generated synthetic data corresponds to the generated value model of the source database, wherein the generated synthetic data corresponds to the determined data dependency, and wherein the generated synthetic data includes different data than the analyzed data within the source database.

12. The medium of claim 11, wherein the generated synthetic data has a smaller size, a same size, or a larger size than the analyzed data.

13. The medium of claim 11, wherein generating synthetic data comprises:
   identifying a data source;
   identifying a value model for the synthetic data based on the generated value model of the source database;
   generating a composite value model based on the determined data dependency; and
   generating row values of the synthetic data based on the data source, the value model, and the composite value model.

14. The medium of claim 11, wherein generating synthetic data comprises:
   generating a foreign key graph; and
   generating a data tables in an order according to the foreign key graph.

15. A system, comprising:
   a memory;
   at least one hardware processor interoperably coupled with the memory and configured to:
      identify a source dataset from a source database;
      extract a schema defining the source database;
      analyze data within the source dataset to generate a value model, the value model describing features of data in each column of each table of the source dataset;
      analyze data within the source database to determine data dependency; and
      generate a data specification file combining the extracted schema, the value model, and the data dependencies.

16. The system of claim 15, wherein determining data dependency comprises determining one or more of inter-table dependency, intra-table dependency, or inter-column dependency of data within the source database.

17. The system of claim 15, comprising instructions to store the data specification file in a database or write the data specification file in a file accessible by a user.

18. The system of claim 15, comprising instructions to generate synthetic data based on the data specification file, wherein the generated synthetic data corresponds to the extracted schema of the source database, wherein the generated synthetic data corresponds to the generated value model of the source database, wherein the generated synthetic data corresponds to the determined data dependency, and wherein the generated synthetic data includes different data than the analyzed data within the source database.

19. The system of claim 18, wherein the generated synthetic data has a smaller size, a same size, or a larger size than the analyzed data.

20. The system of claim 18, wherein generating synthetic data comprises:

identifying a data source;
identifying a value model for the synthetic data based on the generated value model of the source database;
generating a composite value model based on the determined data dependency;
generating a foreign key graph; and
generating row values of the synthetic data based on the data source, the value model, the composite value model and the foreign key graph.

* * * * *